United States Patent
Gao et al.

(10) Patent No.: US 11,657,751 B2
(45) Date of Patent: May 23, 2023

(54) DISPLAY DRIVING CHIP, DISPLAY APPARATUS AND DISPLAY DRIVING METHOD

(71) Applicants: Beijing BOE Optoelectronics Technology Co., Ltd., Beijing (CN); BOE Technology Group Co., Ltd., Beijing (CN)

(72) Inventors: Yang Gao, Beijing (CN); Rui Liu, Beijing (CN); Yuxin Bi, Beijing (CN); Shaolei Zong, Beijing (CN); Jie Yang, Beijing (CN); Gaoming Sun, Beijing (CN); Jinyuan Yang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/472,710

(22) Filed: Sep. 13, 2021

(65) Prior Publication Data
US 2022/0254297 A1 Aug. 11, 2022

(30) Foreign Application Priority Data
Feb. 5, 2021 (CN) .......................... 202110163827.4

(51) Int. Cl.
*G06F 3/01* (2006.01)
*G09G 3/20* (2006.01)

(52) U.S. Cl.
CPC ............ *G09G 3/2092* (2013.01); *G06F 3/013* (2013.01); *G09G 2310/0264* (2013.01)

(58) Field of Classification Search
CPC ......... G09G 3/2092; G09G 2310/0264; G09G 2370/12; G09G 2370/14; G09G 5/363; G09G 5/006; G09G 2340/02; G09G 2354/00; G06F 3/013; G06F 3/1407; G06V 40/18
See application file for complete search history.

(56) References Cited

U.S. PATENT DOCUMENTS

| | | | |
|---|---|---|---|
| 10,852,828 B1 * | 12/2020 | Gatson | G06F 3/014 |
| 11,009,944 B1 * | 5/2021 | Choi | G09G 3/3275 |
| 2009/0185748 A1 * | 7/2009 | Kortum | G06V 20/10 |
| | | | 382/232 |
| 2012/0146891 A1 * | 6/2012 | Kalinli | A63F 13/428 |
| | | | 345/156 |

(Continued)

*Primary Examiner* — Jose R Soto Lopez
(74) *Attorney, Agent, or Firm* — Ling Wu; Stephen Yang; Ling and Yang Intellectual Property

(57) ABSTRACT

Provided are a display driving chip, a display apparatus and a display driving method. The display driving chip includes a gaze tracker, an image receiver, an image parser and an image driver, wherein the gaze tracker is configured to achieve real-time locating for the pupil center of human eyes and real-time calculation for gaze point coordinates, and output the gaze point coordinates of human eyes to the image parser; the image receiver is configured to receive image data to be played through a first image interface and input the image data to be played to the image parser; the image parser is configured to compress or decompress the image data to be played according to the gaze coordinates of human eyes and output the image data to the image driver.

18 Claims, 6 Drawing Sheets

(56) References Cited

U.S. PATENT DOCUMENTS

| | | | |
|---|---|---|---|
| 2012/0319928 A1* | 12/2012 | Rhodes | G02B 27/017 345/8 |
| 2015/0293745 A1* | 10/2015 | Suzuki | G06F 3/013 704/260 |
| 2017/0169602 A1* | 6/2017 | Blackmon | G06T 15/06 |
| 2017/0236466 A1* | 8/2017 | Spitzer | G09G 3/2085 345/560 |
| 2017/0316607 A1* | 11/2017 | Khalid | G02B 27/017 |
| 2018/0090052 A1* | 3/2018 | Marsh | G09G 3/3406 |
| 2018/0196512 A1* | 7/2018 | Kim | G06F 3/013 |
| 2018/0262758 A1* | 9/2018 | El-Ghoroury | H04N 13/344 |
| 2018/0288423 A1* | 10/2018 | Vembar | G06T 9/00 |
| 2019/0005884 A1* | 1/2019 | Yoo | G06F 3/011 |
| 2019/0043167 A1* | 2/2019 | Steyskal | G06T 3/4038 |
| 2019/0206369 A1* | 7/2019 | Kempf | G06F 3/013 |
| 2019/0273910 A1* | 9/2019 | Malaika | G06F 3/011 |
| 2019/0347763 A1* | 11/2019 | Goel | G06T 3/0025 |
| 2020/0014904 A1* | 1/2020 | Wetzstein | G06F 3/14 |
| 2020/0034617 A1* | 1/2020 | Croxford | G06T 7/70 |
| 2020/0050265 A1* | 2/2020 | Krishnakumar | G06F 3/013 |
| 2020/0090396 A1* | 3/2020 | Holmes | G06T 1/20 |
| 2020/0166996 A1* | 5/2020 | Seo | G06V 10/25 |
| 2020/0280739 A1* | 9/2020 | Fitzgerald | H04N 19/162 |
| 2020/0372677 A1* | 11/2020 | Yoon | G06T 7/73 |
| 2021/0088784 A1* | 3/2021 | Whitmire | G06V 20/597 |
| 2021/0098535 A1* | 4/2021 | Cai | G09G 3/2051 |
| 2021/0110613 A1* | 4/2021 | Ha | G06T 5/002 |
| 2021/0142443 A1* | 5/2021 | Eble | H04N 21/631 |
| 2021/0151009 A1* | 5/2021 | Ikeda | G09G 5/377 |
| 2021/0165229 A1* | 6/2021 | Stahl | H04N 19/543 |
| 2021/0174768 A1* | 6/2021 | Jarvenpaa | G09G 5/37 |
| 2021/0333883 A1* | 10/2021 | Stafford | A63F 13/26 |
| 2021/0344991 A1* | 11/2021 | Todd | H04N 21/21805 |
| 2022/0075983 A1* | 3/2022 | Ohno | G06T 7/73 |
| 2022/0113795 A1* | 4/2022 | Eder | G06F 3/012 |
| 2022/0146828 A1* | 5/2022 | Ohba | G09G 5/003 |
| 2022/0147140 A1* | 5/2022 | Ollila | A61B 5/004 |
| 2022/0148337 A1* | 5/2022 | Meng | G06V 10/60 |
| 2022/0197381 A1* | 6/2022 | Young | G06F 1/163 |
| 2022/0206571 A1* | 6/2022 | Drozdov | G06V 40/19 |
| 2022/0236797 A1* | 7/2022 | Drozdov | G06T 7/74 |

* cited by examiner

DISPLAY DRIVING CHIP, DISPLAY APPARATUS AND DISPLAY DRIVING METHOD

CROSS-REFERENCE TO RELATED APPLICATION

The present application claims priority of Chinese Patent Application No. 202110163827.4 filed to the CNIPA on Feb. 5, 2021, the content of which is incorporated herein by reference.

TECHNICAL FIELD

Embodiments of the present disclosure relate to, but are not limited to the field of smart display technologies, in particular to a display driving chip, a display apparatus and a display driving method.

BACKGROUND

In the process of picture rendering, smart display (such as Smartview) technology performs high-definition rendering for the human eye gaze region and low-definition rendering for the peripheral field of view. When Eyeball moves, that is, when the eye gaze region changes, the region of the high-definition rendering will be changed accordingly, and Smartview technology solves the bottleneck with respect to hardware transmission and software rendering of monocular high-resolution images to a certain extent.

Nowadays, Smartview technology is usually implemented based on the central processing unit (CPU) or graphics processing unit (GPU) of the playback system, which integrates many technologies such as eye tracking, gaze point calculation, Smartview image real-time rendering, etc., resulting in over-complex functions of the playback system terminals, high pressure of real-time rendering and low real-time driving efficiency.

SUMMARY

The following is a summary about the subject matter described in the present disclosure in detail. The summary is not intended to limit the scope of protection of the claims.

An embodiment of the disclosure provides a display driving chip, including a gaze tracker, an image receiver, an image parser and an image driver, wherein: the gaze tracker is configured to perform real-time locating for the pupil center of human eyes and real-time calculation for gaze point coordinates, and output the gaze point coordinates of human eyes to the image parser; the image receiver is configured to receive image data to be played through a first image interface and input the image data to be played to the image parser; the image parser is configured to compress or decompress the image data to be played according to the gaze point coordinates of human eyes, and output the compressed or decompressed image data to the image driver; the image driver is configured to receive the image data output by the image parser, and control a connected display panel for real-time display driving according to a compression pattern of the image data and the coordinates of the gaze point.

In an exemplary embodiment, the gaze tracker includes a pattern parser, a human eye detector, a pupil locater and a gaze point calculator, wherein the pattern parser is configured to determine a working pattern of an external pupil image acquisition component, and when the working pattern is a human face pattern, a human face image acquired by the pupil image acquisition component is input to the human eye detector; when the working pattern is a human eye pattern, a human eye image acquired by the pupil image acquisition component is input to the pupil locater; the human eye detector is configured to perform eye detection on the human face image acquired by the pupil image acquisition component and output a detected human eye image to the pupil locater; the pupil locater is configured to calculate the position coordinates of the pupil of human eyes in the human eye image; the gaze point calculator is configured to calculate the gaze point coordinates of human eyes according to the position coordinates of the pupils of human eyes in the human eye image, and output the gaze point coordinates of human eyes to the image parser.

In an exemplary embodiment, the pupil locater includes an image preprocessor, a pupil edge coordinate processor and a pupil center coordinate processor, wherein: the image preprocessor is configured to remove noise information in the human eye image and determine a pupil target region; the pupil edge coordinate processor is configured to determine pupil edge coordinates according to the pupil target region; the pupil center coordinate processor is configured to determine the pupil center coordinates according to the pupil edge coordinates.

In an exemplary embodiment, the gaze tracker outputs the gaze point coordinates of human eyes to the image parser through an Inter-Integrated Circuit (IIC) bus, a high-speed Synchronous Serial Interface (such as Serial Peripheral interface (SPI)) bus or a universal asynchronous receiver/transmitter UART bus.

In an exemplary embodiment, the first image interface includes a high definition multimedia interface (HDMI), a display Port (DP), a mobile industry processor interface (MIPI) or a low voltage differential signal (LVDS).

In an exemplary embodiment, the image parser is configured to detect whether the compressed image data needs to be decompressed when the image data to be played is compressed image data, and if so, decompress the compressed image data according to the gaze point coordinates of human eyes and output the decompressed image data to the image driver; if not, output compressed image data to the image driver; when the image data to be played is an original image data, store the original image data into a first cache region, reading the data of the first cache region, compress the read data according to the gaze point coordinates of human eyes, and outputting to the image driver.

In an exemplary embodiment, the image driver controlling the connected display panel for real-time display driving includes: dividing a display region corresponding to the display panel into a high-definition region and a low-definition region according to the gaze point coordinates of the human eyes; and driving the high-definition region and the low-definition region by different driving timings.

In an exemplary embodiment, the driving of the high-definition region and the low-definition region by different driving timings includes: the high-definition region is driven in the following ways: gate lines are driven one by one and data lines are driven one by one; the low-definition region is driven in one or more of the following ways: a plurality of rows of gate lines are combined into one row to be driven, and a plurality of columns of data lines are combined into one column to be driven.

In an exemplary embodiment, the driving of the high-definition region and the low-definition region by different driving timings includes: when the image data received by the image driver is data obtained by the image parser compressing the original image data, first driving the image display of the low-definition region, and then driving the image display of the high-definition region several times; when the image data received by the image driver is data obtained by an external image player compressing the original image data, first driving the image display of the high-definition region, and then driving the image display of the low-definition region;

An embodiment of the disclosure further provides a display apparatus, including: a pupil image acquisition component, an image player, a display panel and any one of the aforementioned display driving chip, wherein: the pupil image acquisition component is configured to acquire user images and output the acquired user images to a gaze tracker; the image player is configured to generate image data to be played and output it to an image receiver; and the display panel is configured to display image data.

In an exemplary embodiment, the gaze tracker is further configured to output gaze point coordinates of human eyes to the image player; the image player is further configured to receive the gaze point coordinates of the human eyes and compress the image data to be played according to the gaze point coordinates of the human eyes.

An embodiment of the present disclosure further provides a display driving method, including: the gaze tracker performing real-time locating for the pupil center of human eyes and real-time calculation for gaze point coordinates and outputting the gaze point coordinates of human eyes to the image parser; an image receiver receiving image data to be played through a first image interface and inputting the image data to be played to the image parser; the image parser compressing or decompressing the image data to be played according to the gaze coordinates of human eyes, and outputting the compressed or decompressed image data to the image driver; and the image driver receiving the image data output by the image parser, and controlling the connected display panel for real-time display driving and according to the compression pattern of the image data and the coordinates of the gaze point.

Other features and advantages of the present disclosure will be described in the subsequent description, and, in part, become apparent from the description, or can be understood by implementing the present disclosure. Other advantages of the present disclosure can be implemented and achieved by the solutions described in the specification and accompanying drawings.

Other aspects will become apparent upon reading and understanding the accompanying drawings and detailed description.

BRIEF DESCRIPTION OF DRAWINGS

The accompanying drawings are used to provide an understanding of technical solutions of the present disclosure, constitute a part of the description, serve to explain the technical solutions of the present disclosure together with embodiments of the present disclosure, and are not to be construed as limitations on the technical solutions of the present disclosure.

DETAILED DESCRIPTION

Specific implementations of the present disclosure will be described further in detail below with reference to the accompanying drawings and embodiments. The following embodiments serve to illustrate the present disclosure, but are not intended to limit the scope of the present disclosure. The embodiments in the present disclosure and the features in the embodiments may be randomly combined with each other if there is no conflict.

Currently, Smartview technology is mainly achieved relying on a playback system (its technical core depends on CPU/GPU), and its technical architecture uses eye locating equipment such as eye tracker or personal computer (PC) in achieving the steps of eye image acquisition, pupil locating, gaze point calculation, etc. After obtaining gaze point coordinates, the playback system renders the original image into an image with Smartview effect based on the CPU/GPU, the image with Smartvie effect is then provided to a timing controller such as a Timer Control Register (TCON) to complete the final step of display driving. The current playback system supported by Smartview technology is very complex, which not only needs to implement eye tracking, gaze point calculation and other complex tasks, but implements real-time rendering for Smartview images according to gaze point coordinates. Therefore, the playback system has disadvantages such as high rendering pressure and high driving bandwidth.

Figure 1:
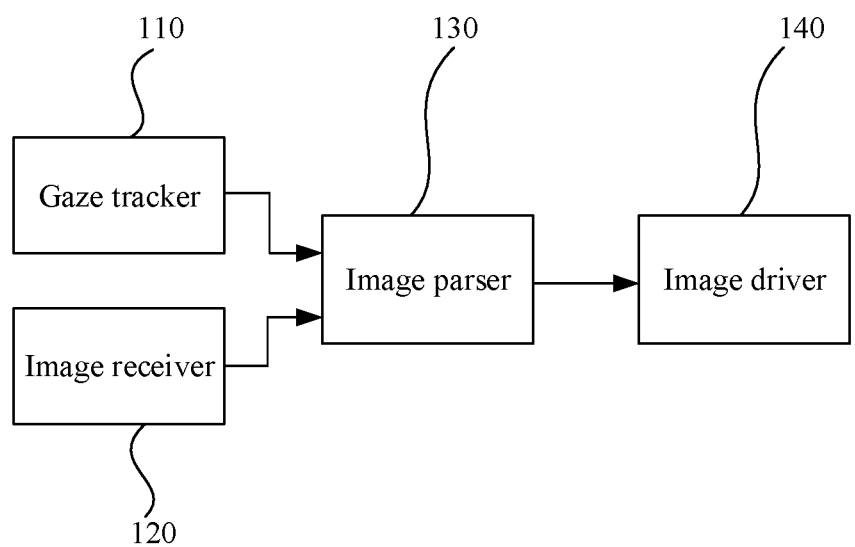
FIG. 1 is a schematic diagram of a structure of a display driving chip according to an embodiment of the present disclosure.
Figure 2:
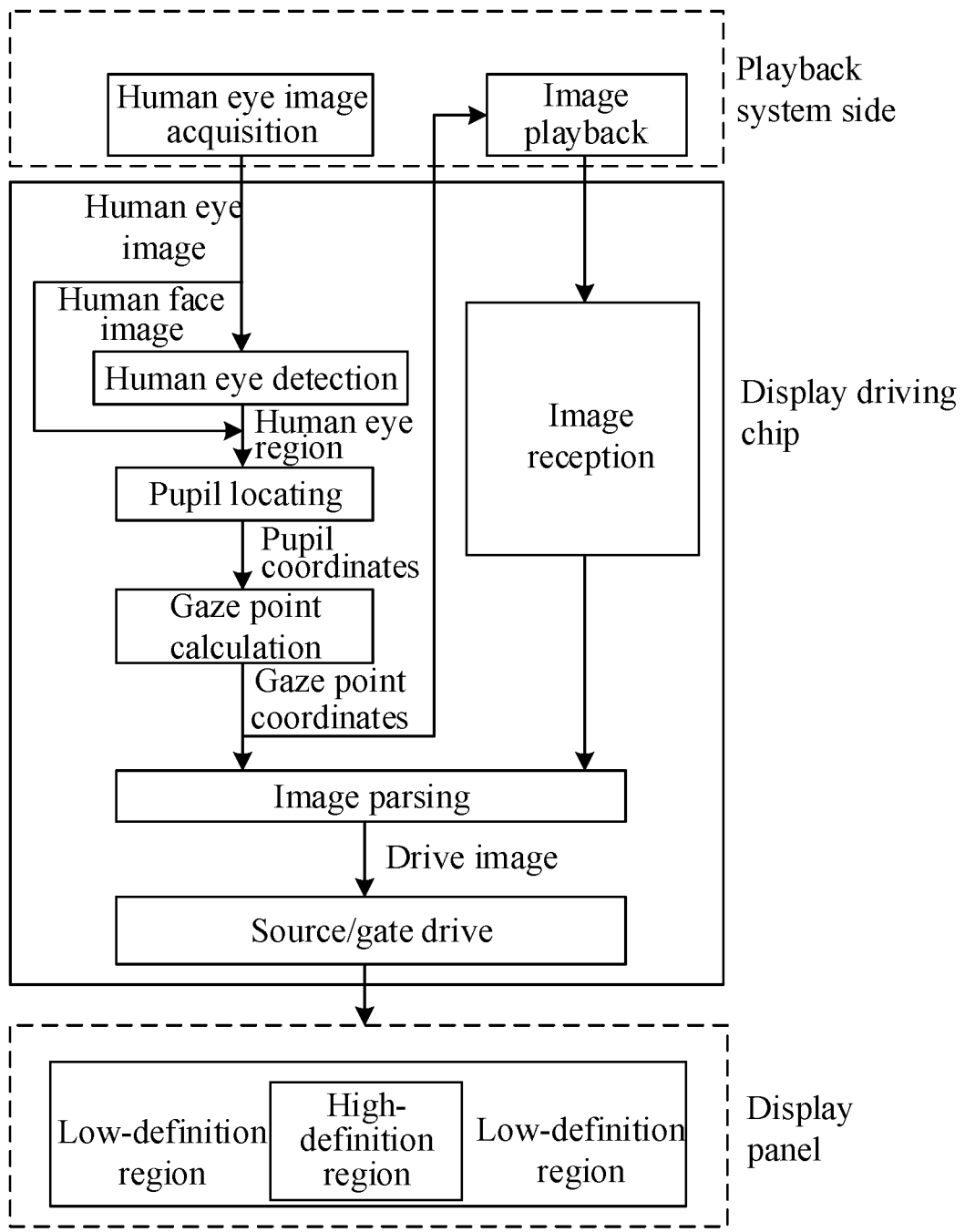
FIG. 2 is a schematic diagram of a driving process for a display driving chip according to an embodiment of the disclosure.

As shown in FIG. 1 and FIG. 2, an embodiment of the present disclosure provides a display driving chip, which mainly includes a gaze tracker 110, an image receiver 120, an image parser 130 and an image driver 140.

The gaze tracker 110 is configured to acquire user images acquired by an external pupil image acquisition component, implement real-time locating for the pupil center of human eyes and real-time calculation for gaze point coordinates with respect to the acquired user images, obtain gaze point coordinates of human eyes in real time, and output the gaze point coordinates of human eyes to the image parser 130; the image receiver 120 is configured to receive image data to be played through a first image interface and input the image data to be played to the image parser 130; the image parser 130 is configured to compress or decompress the image data to be played according to the gaze coordinates of human eyes, and output the compressed or decompressed image data to the image driver 140; the image driver 140 is configured to receive the image data output by the image parser 130, and control the connected display panel for real-time driving display according to the compression pattern of the image data and the coordinates of the gaze point.

The display driving chip provided by the embodiment of the present disclosure integrates a gaze tracker 110, an image receiver 120, an image parser 130 and a driver 140, wherein the gaze tracker 110 is configured to achieve the real-time locating function for the gaze position of human eyes relative to the display screen, the image receiver 120 is configured to receive image data to be played, the image parser 130 is configured to compress or decompress the image data to be played according to the gaze position of human eye, and the image driver 140 is configured to drive the display panel to display in real time. Thus the display driving chip achieves the function of smart display, which considers both the structures of the playback system side and the display driver side, simplifies the functions of the playback system, effectively relieves the real-time rendering pressure of the playback system side, and improves the refresh efficiency of the display driver system, thus further increases the added value of display products.

Figure 3:
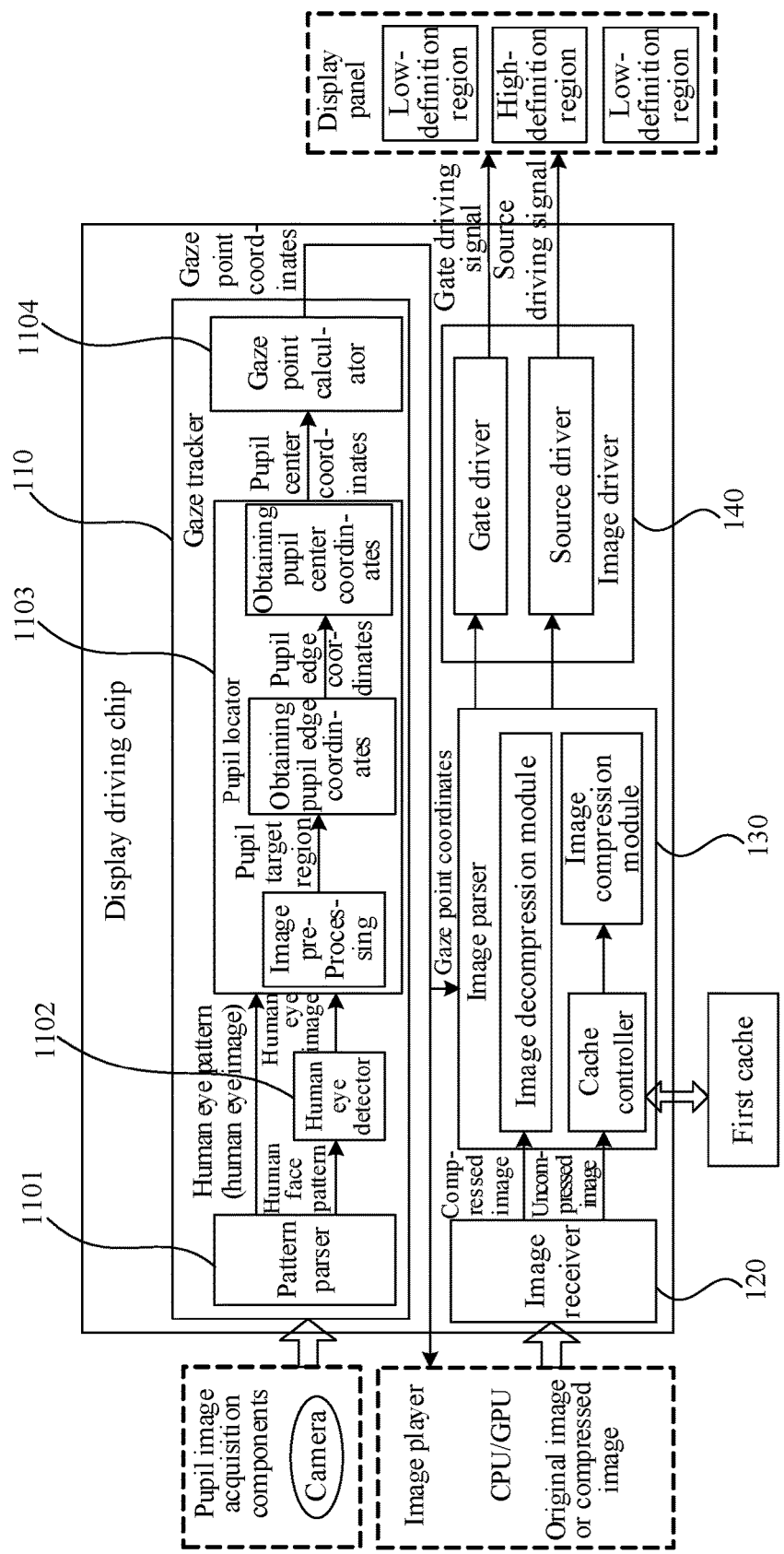
FIG. 3 is a schematic diagram of architecture of a display driving chip according to an embodiment of the present disclosure.
Figure 4:
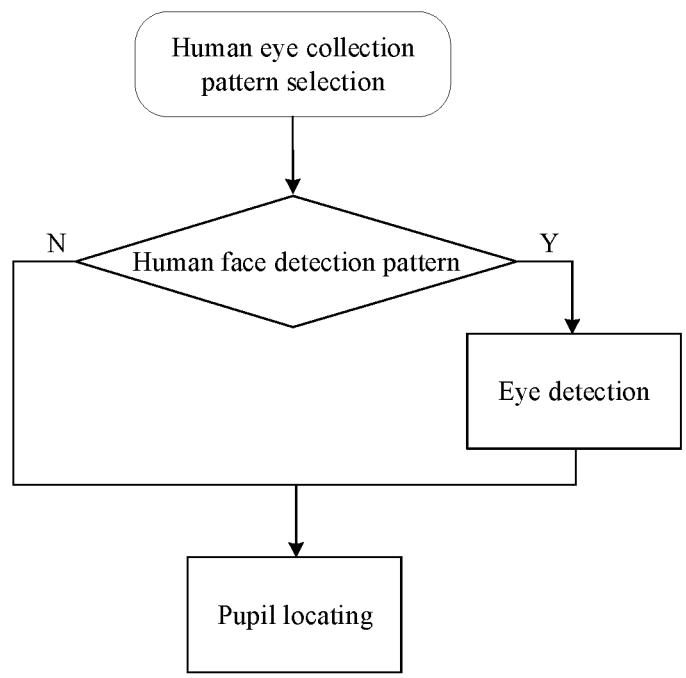
FIG. 4 is a schematic flowchart of pupil locating by a gaze tracker according to an embodiment of the present disclosure.

In an exemplary embodiment, as shown in FIG. 3, the gaze tracker 110 includes a pattern parser 1101, a human eye detector 1102, a pupil locater 1103 and a gaze point calculator 1104, wherein:

the pattern parser 1101 is configured to determine the working pattern of the external pupil image acquisition component, and when the working pattern is a human face pattern, the human face image acquired by the pupil image acquisition component is input to the human eye detector 1102; when the working pattern is a human eye pattern, the human eye image acquired by the pupil image acquisition component is input to the pupil locater 1103, as shown in FIG. 4;

the human eye detector 1102 is configured to perform eye detection on the human face image acquired by the pupil image acquisition component and output the detected human eye image to the pupil locater 1103; the pupil locater 1103 is configured to calculate the position coordinates of the pupil in the human eye image; the gaze point calculator 1104 is configured to calculate the gaze point coordinates of human eyes according to the position coordinates of the pupil of human eyes in the human eye image, and output the gaze point coordinates of human eyes to the image parser 130.

In an exemplary embodiment, the external pupil image acquisition component may be an infrared camera, and the pupil image acquisition component can provide the display driving chip with images of human faces or eyes in real time.

In an exemplary embodiment, when the external pupil image acquisition component uses the human face pattern, the pattern parser 1101 inputs the human face image acquired by the pupil image acquisition component into the human eye detector 1102, and the human eye detector 1102 performs human eye detection on the human face image to obtain a human eye image.

In an exemplary embodiment, when the gaze tracker 110 (gaze point calculator 1104) outputs the gaze point coordinates of human eyes to the image parser 130, it can also output the gaze point coordinates of human eyes to an external image player (i.e., the playback system side) for the image player to compress the image data to be played according to the gaze point coordinates of human eyes.

In an exemplary embodiment, one or more of the pattern parser 1101, the human eye detector 1102, the pupil locater 1103, and the gaze point calculator 1104 may be implemented by an integrated IP (Intellectual Property) hardcore.

In this embodiment, the gaze tracker 110 designed by hardware application specific integrated circuit (ASIC) can take advantage of its parallel computing, and has the characteristics of fast real-time response, high locating accuracy, etc., which reduces the driving pressure of the playback system and ensures a smoother display effect of the display apparatus.

In an exemplary embodiment, as shown in FIG. 3, the pupil locater 1103 may include an image preprocessor, a pupil edge coordinate processor and a pupil center coordinate processor, wherein: the image preprocessor is configured to remove noise information in the human eye image and determine a pupil target region; the pupil edge coordinate processor is configured to determine pupil edge coordinates according to the pupil target region; and the pupil center coordinate processor is configured to determine the pupil center coordinates according to the pupil edge coordinates.

In this embodiment of the disclosure, the pupil locater 1103 calculates the specific position coordinates of the human eye pupil in the human eye image in real time, and the pupil locater 1103 includes but is not limited to the following core processing modules: an image preprocessor, a pupil edge coordinate processor and a pupil center coordinate processor.

In an exemplary embodiment, the gaze tracker 110 may output the gaze point coordinates of human eyes to the image parser 130 through an Inter-Integrated Circuit (IIC) bus, a high-speed Synchronous Serial Interface (such as Serial Peripheral interface (SPI)) bus or a universal asynchronous receiver/transmitter (UART) bus, etc.

In an exemplary embodiment, the image player generates image data to be played and outputs it to the image receiver 120 through the first image interface. For example, the image player may be an image rendering system or an image player, which is located outside the display driving chip and provides the display driving chip with image data to be played.

In an exemplary embodiment, the first image interface includes, but is not limited to, High Definition Multimedia Interface (HDMI), Display Port (DP), Mobile Industry Processor Interface (MIPI), Low-Voltage Differential Signaling (LVDS), etc.

In an exemplary embodiment, the image data to be played generated by the image player may be compressed image data (of which the compressed position may be determined based on the coordinates of the gaze points fed back by the display driving chip), or uncompressed original image data.

The image data to be played in the embodiments of the present disclosure may be compressed at the image player (i.e., the playback system side) or at the display driving chip side, which reduces the performance requirements for the playback system side and ensures the implementation flexibility of the Smartview scheme of the entire system.

Figure 5:
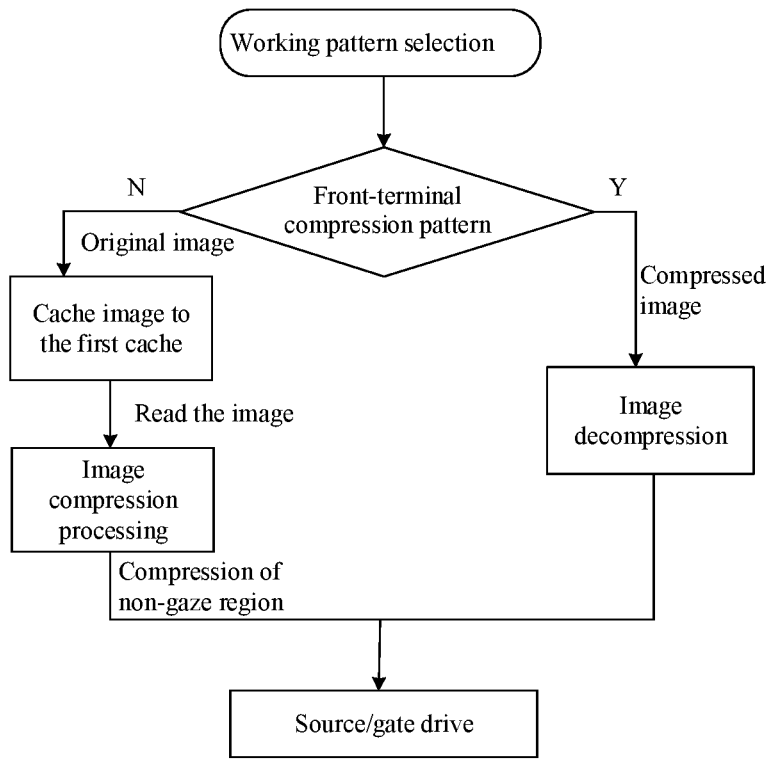
FIG. 5 is a schematic flowchart of image parsing by an image parser according to an embodiment of the present disclosure.

In an exemplary embodiment, as shown in FIG. 5, the image parser 130 is configured to: detect whether the compressed image data needs to be decompressed (choose whether to decompress according to the actual working mode) when the image data to be played is compressed image data, and if so, decompressing the compressed image data according to the gaze point coordinates of human eyes and outputting the decompressed image data to the image driver; if not, outputting compressed image data to the image driver; when the image data to be played is an original image data, storing the original image data into a first cache region to achieve frame buffering, reading the data of the first cache region, compressing the read data according to the gaze point coordinates of human eyes, and outputting to the image driver.

In an exemplary embodiment, the first cache region may be a DDR3 (Double Data Rate 3) cache or an SRAM (Static Random Access Memory).

In an exemplary embodiment, as shown in FIG. 3, the image driver 140 may include a source driver and a gate driver, wherein the source driver is configured to provide a source driving signal for the data lines in the display panel according to the image data output by the image parser 130, and the gate driver is configured to provide a gate driving signal for the gate lines in the display panel according to the image data output by the image parser 130.

In an exemplary embodiment, the image driver 140 controls the connected display panel to drive the display in real time, including:

According to the coordinates of gaze points of human eyes, the display region corresponding to the display panel is divided into a high-definition region and a low-definition region. Exemplarily, the gaze region of the human eye is a high-definition region, and the non-gaze region of the human eye is a low-definition region.

The high-definition region and the low-definition region are driven by different driving timings.

The driving pattern of TCON based on the current Smartview technology is relatively simple, and there is no differentiated driving display for the gaze region and the non-gaze region, in other words, the display refresh rate of the non-gaze region is completely equal to that of the gaze region while the area of the gaze region is often smaller than that of the non-gaze region, which means that there is a serious waste of bandwidth at the driving terminal of TCON. The existing problem of the conventional Smartview technology implementation scheme is a systematic problem, and it is also the main cause of the restriction on further improving the display refresh rate of the conventional Smartview technology.

Figure 6:
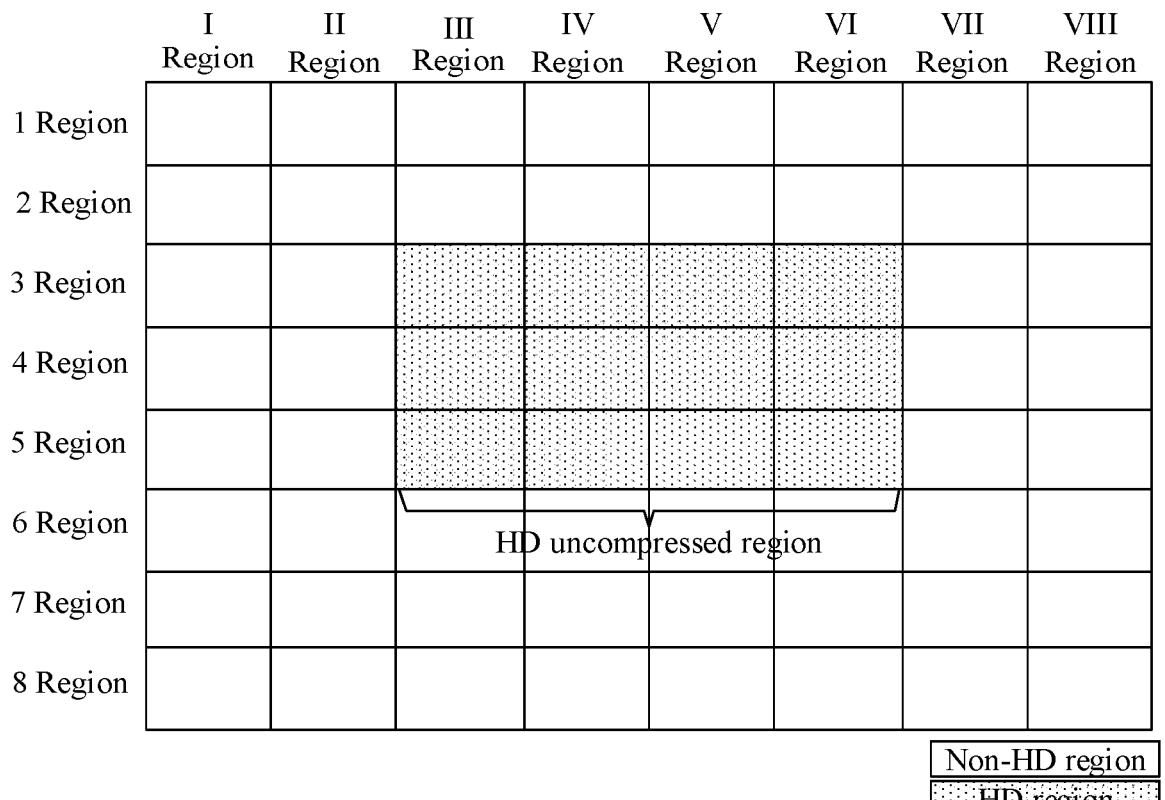
FIG. 6 is a schematic diagram of a partition structure of a display panel according to an embodiment of the present disclosure.

As shown in FIG. 6, the display driving chip provided by the embodiment of this disclosure achieves the Smartview function based on the following ways: the image driver 140 drives the high-definition region (gaze region) and the low-definition region (non-gaze region) in the display panel with different driving timings, which not only effectively reduces the driving pressure on the playback system side and increases the effective bandwidth utilization rate on the display panel side, but also significantly improves the display refresh rate on a premise of achieving the Smartview function.

In an exemplary embodiment, the image driver 140 uses different driving timings for the high-definition region and the low-definition region, including: for high-definition regions, the following methods are used: gate lines are driven row by row, and multiplexed data lines are driven column by column; for the low-definition region, any one of the following driving methods are used: a plurality of rows of gate lines are combined into one row to be driven and multiplexed data lines are driven column by column, gate lines are driven row by row and multiplexed data lines are combined into one column to be driven, and a plurality of rows of gate lines are combined into one row to be driven and a plurality of columns of multiplexed data lines are combined into one column to be driven.

Illustratively, for the high-definition region, the image driver 140 uses the following driving patterns: the multiplexed data lines in the high-definition region are driven column by column, and the gate lines are normally driven row by row. For the low-definition region, the used driving pattern is as follows: the multiplexed data lines in the low-definition region are driven column by column, and several rows of the gate lines are driven at the same time (i.e., a plurality of rows of gate lines are combined into one row to be driven, for example, every four rows of gate lines may be combined into one row to be driven), so as to display the low-definition image (i.e., compressed image). The quantity of the combined rows of the gate lines or the quantity of the combined columns of the multiplexed data lines is not limited in the embodiments of the present disclosure.

Figure 7:
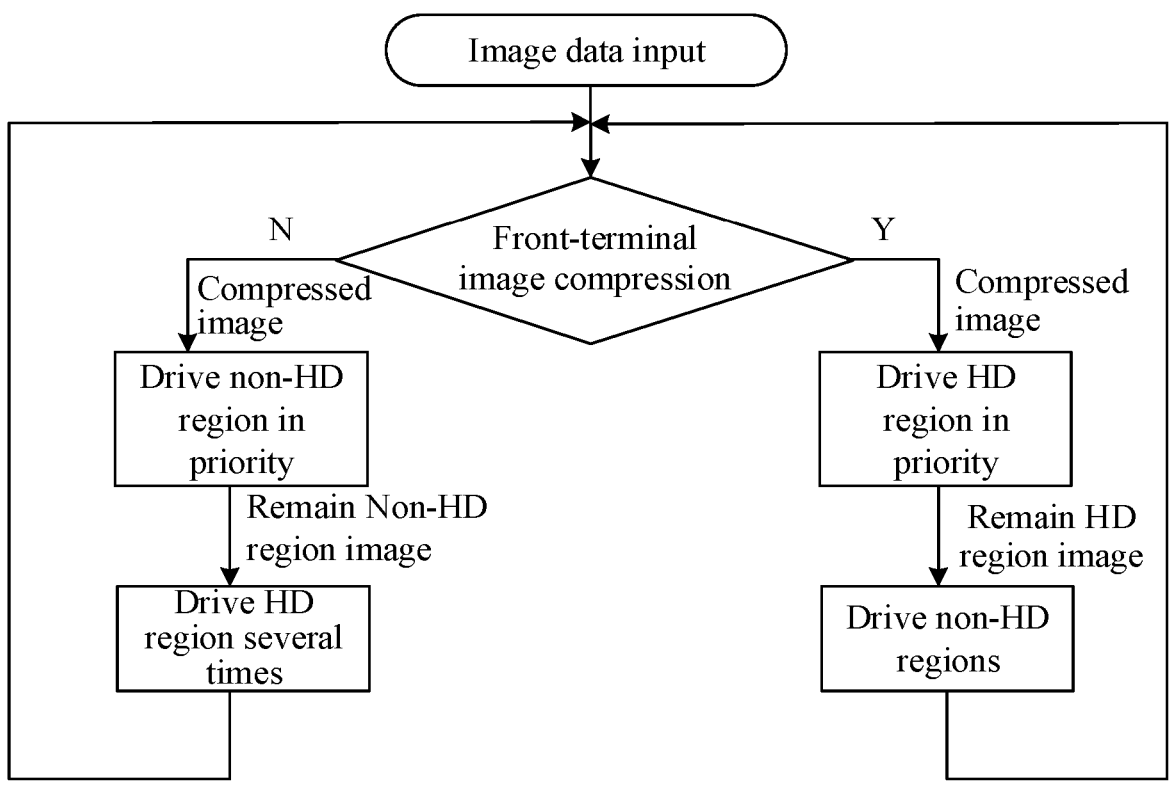
FIG. 7 is a flowchart of image driving by an image driver according to an embodiment of the disclosure.

In an exemplary embodiment, as shown in FIG. 7, the high-definition region and the low-definition region are driven by different driving timings includes: when the image data received by the image driver 140 is data obtained by the image parser 130 compressing the original image data, first driving the image of the low-definition region to display, and then driving the image of the high-definition region to display several times; when the image data received by the image driver 140 is data obtained by an image player compressing the original image data, first driving the image of the high-definition region to display, and then driving the image of the low-definition region to display.

Embodiments of the present disclosure consider that the image to be displayed provided by the front-terminal image player to the image parser 130 includes two possibilities: the first possibility is the original uncompressed image. In this case, the image parser 130 needs to parse the division of high-definition region and low-definition region according to the coordinates of the gaze point, and then compress the original image. The principle of compression is that the gaze point and its surrounding limited regions are high-definition regions, which are not compressed, and the regions away from the gaze point are low-definition regions, which may be compressed; the compressed images are then transmitted to the image driver 140;

The second possibility is the compressed image. In this case, the image parser 130 does not need to do compression operation any more, but directly transmit the image to the image driver 140.

Figure 8:
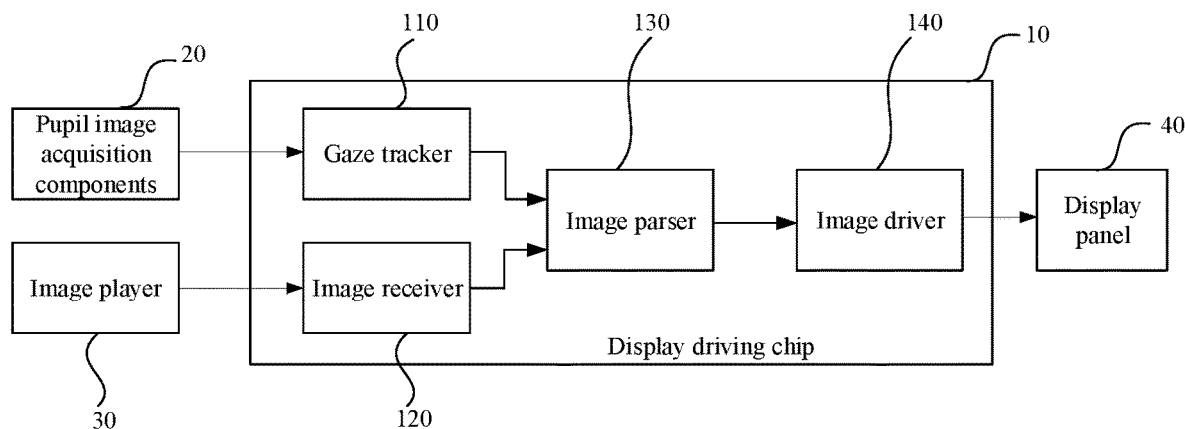
FIG. 8 is a schematic diagram of a structure of a display apparatus according to an embodiment of the present disclosure.

As shown in FIG. 8, the embodiment of the present disclosure further provides a display apparatus, which includes a pupil image acquisition component 20, an image player 30, a display panel 40 and any one of the aforementioned display driving chip 10, wherein: the pupil image acquisition component 20 is configured to acquire a pupil image of a user and output the acquired user image to the gaze tracker 110; the image player 30 is configured to generate image data to be played and output it to the image receiver 120; and the display panel 40 is configured to display image data.

In an exemplary embodiment, the display driving chip includes a gaze tracker 110, an image receiver 120, an image parser 130 and a driver 140, wherein: the gaze tracker 110 is configured to acquire the user image acquired by the external image acquisition component, process the acquired user image to obtain the gaze point coordinates of human eyes, and output the gaze point coordinates of human eyes to the image parser 130; the image receiver 120 is configured to receive image data to be played through a first image interface and input the image data to be played to the image parser 130; the image parser 130 is configured to compress or decompress the image data to be played according to the gaze coordinates of human eyes, and output the compressed or decompressed image data to the image driver 140; the image driver 140 is configured to receive the image data output by the image parser 130, and control the connected display panel for real-time display driving according to the compression pattern of the image data and the coordinates of the gaze point.

In an exemplary embodiment, the gaze tracker 110 is further configured to output the gaze point coordinates of human eyes to the image player 30; the image player 30 is further configured to receive the gaze point coordinates of the human eyes and compress the image data to be played according to the gaze point coordinates of the human eyes.

In an exemplary embodiment, when compressing the image data to be played, the image player 30 can divide the high-definition region and the low-definition region according to the gaze coordinates of human eyes, and then obtain which partitions of the display panel 40 the high-definition region is located in. The compression processing methods for image data of high-definition region and low-definition region are as follows:

(1) Image data in the high-definition region is not compressed;

(2) For the image data in the non-high-definition region, the row compression pattern, the column compression pattern or the row-column combined compression pattern may be adopted for compression processing;

a) Row compression pattern: several rows are compressed, for example, four rows are combined into one line, and four rows of gate lines are driven at the same time during display;

b) Column compression pattern: several columns are compressed, for example, four columns are combined into one column, and the data lines of the four columns are driven at the same time during display;

C) Row-column combined compression pattern: 4 rows * 4 columns are combined into 1 row and 1 column, and 4 rows of gate lines are driven at the same time and 4 columns of data lines are driven at the same time during display. In an exemplary embodiment, the display panel 40 includes N*M partitions, where N is the number of partitions in the row direction and M is the number of partitions in the column direction, and both N and M can be arbitrary natural numbers. Exemplarily, as shown in FIG. 6, N=8, M=8, high-definition region is N1*M1 partitions, N1 is a natural number less than N, M1 is a natural number less than M, and exemplarily, as shown in FIG. 6, N1=3, M1=4.

According to the display apparatus disclosed by the embodiment of the present invention, by integrating the gaze tracker, the image receiver, the image parser and the image driver in the display driving chip, the functions of the playback system side are simplified, the real-time rendering pressure of the playback system side is effectively relieved, and the driving efficiency of the playback system side is improved, thereby further increasing the added value of display products.

Figure 9:
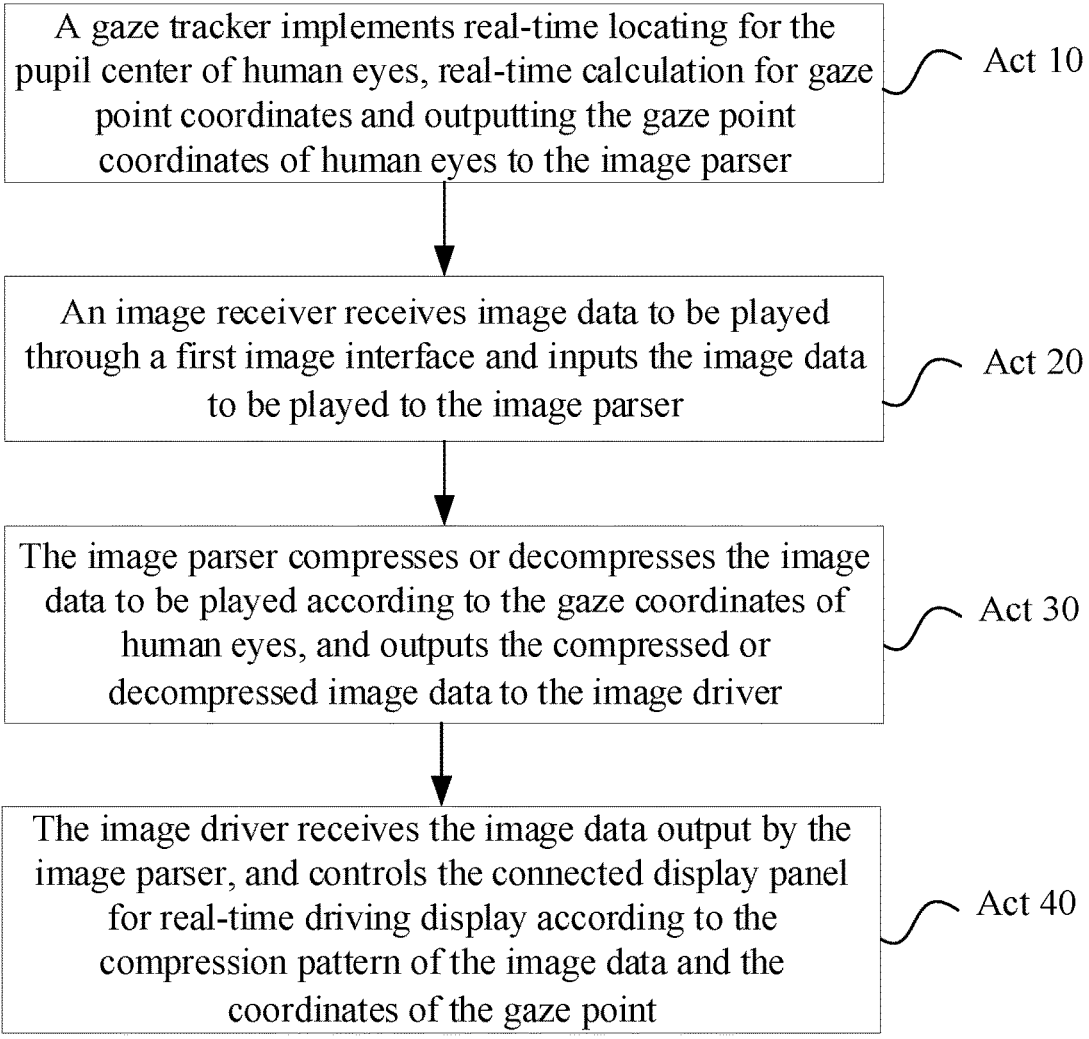
FIG. 9 is a schematic flowchart of a display driving method according to an embodiment of the disclosure.

As shown in FIG. 9, an embodiment of the present disclosure further provides a display driving method, including:

Act 10, a gaze tracker achieves real-time locating for the pupil center of human eyes, real-time calculation for gaze point coordinates and outputting the gaze point coordinates of human eyes to the image parser;

Act 20, an image receiver receives image data to be played through a first image interface and inputs the image data to be played to the image parser;

Act 30, the image parser performs compressing or decompressing for the image data to be played according to the gaze coordinates of human eyes, and outputting the compressed or decompressed image data to the image driver; and Act 40, the image driver receives the image data output by the image parser, and controls the connected display panel for real-time display driving according to the compression pattern of the image data and the coordinates of the gaze point.

In an exemplary embodiment, the gaze tracker includes a pattern parser, a human eye detector, a pupil locater and a gaze point calculator. The gaze tracker 110 acquires the user image acquired by the external image acquisition component; processes the acquired user image to obtain the gaze point coordinates of human eyes, which includes:

The pattern parser determines the working pattern of the external image acquisition component, and when the working pattern is a human face pattern, the human face image acquired by the image acquisition component is input to the human eye detector 1102; when the working pattern is a human eye pattern, the human eye image acquired by the image acquisition component is input to the pupil locater; the human eye detector performs eye detection on the human face image acquired by the image acquisition component and output the detected human eye image to the pupil locater; the pupil locater calculates the position coordinates of the pupil in the human eye image; and the gaze point calculator calculates the gaze point coordinates of human eyes according to the position coordinates of the pupil of human eyes in the human eye image, and output the gaze point coordinates of human eyes to the image parser.

In an exemplary embodiment, the pupil locater includes an image preprocessor, a pupil edge coordinate processor and a pupil center coordinate processor. The pupil locater calculates the position coordinates of the pupil in the human eye image, including: the image preprocessor removes noise information in the human eye image and determine a pupil target region; the pupil edge coordinate processor determines pupil edge coordinates according to the pupil target region; and the pupil center coordinate processor determines the pupil center coordinates according to the pupil edge coordinates.

In an exemplary embodiment, the gaze tracker outputs the gaze coordinates of human eyes to the image parser through an Inter-Integrated Circuit (IIC) bus, a high-speed Serial Peripheral interface (SPI) bus or a universal asynchronous receiver/transmitter UART bus.

In an exemplary embodiment, the first image interface includes a high definition multimedia interface HDMI, a display interface DP, a mobile industry processor interface MIPI or a low voltage differential signal LVDS.

In an exemplary embodiment, Act 30 may include: detecting whether the compressed image data needs to be decompressed when the image data to be played is compressed image data, and if so, decompressing the compressed image data according to the gaze point coordinates of human eyes and outputting the decompressed image data to the driver; if not, outputting compressed image data to the driver; when the image data to be played is an original image data, storing the original image data into a first cache region, reading the data of the first cache region, compressing the read data according to the gaze point coordinates of human eyes, and outputting to the driver.

In an exemplary embodiment, Act 40 may include: the driver receives the image data output by the image parser, and divides the display region corresponding to the display panel into a high-definition region and a low-definition region according to the gaze coordinates of human eyes; the driver drives the high-definition region and the low-definition region with different driving timings.

In an exemplary embodiment, the driver drives the high-definition region and the low-definition region with different driving timings includes: the high-definition region is driven in the following ways: one by one driving gate lines and one by one driving data lines; the low-definition region is driven in one or more of the following ways: a plurality of rows of gate lines are combined into one row to be driven, and a plurality of columns of data lines are combined into one column to be driven.

In an exemplary embodiment, the driver drives the high-definition region and the low-definition region with different driving timings includes: when the image data received by the driver is the data obtained by compressing the original image data by the image parser, first the image display in the low-definition region is driven, and the image displayed in the low-definition region is maintained, and then the image displayed in the high-definition region is driven for several times; when the image data received by the driver is data obtained by compressing the original image data by an external image player, first the image display in the high-definition region is driven to maintain the image displayed in the high-definition region, and then the image display in the low-definition region is driven.

According to the display driving method disclosed in the embodiment of the present invention, by integrating the gaze tracker, the image receiver, the image parser and the driver in the display driving chip, the functions of the playback system side are simplified, the real-time rendering pressure of the playback system side is effectively relieved, and the driving efficiency of the playback system side is improved, thereby further increasing the added value of display products.

In an exemplary embodiment, the driver uses different driving timings to drive the high-definition region (gaze region) and the low-definition region (non-gaze region) in the display panel, which not only effectively reduces the driving pressure of the playback system side, increases the effective bandwidth utilization rate of the display panel side, but also achieves the significant improving of the display refresh rate of the display panel.

In the description of the present disclosure, it should be understood that an orientation or position relationship indicated by the terms "middle", "upper", "lower", "front", "rear", "vertical", "horizontal", "top", "bottom", "inner", "outer" and the like is based on the orientation or position relationship shown in the accompanying drawings, which is only for the convenience of describing the present disclosure and simplifying the description, rather than indicating or implying that the apparatus or element referred to must have the specific orientation, or be constructed and operated in the specific orientation, and thus cannot be interpreted as a limitation on the present disclosure.

In the descriptions of the embodiments of the disclosure, unless otherwise specified and limited, terms "mounting", "mutual connection" and "connection" should be generally understood. For example, the connection may be fixed connection or detachable connection or integral connection, the connection may be mechanical connection or electrical connection, and the connection may be direct connection or indirect connection through an intermediate or communication inside two elements. Those of ordinary skill in the art can understand the specific meanings of the above mentioned terms in the present disclosure according to specific situations.

It can be understood by those of ordinary skill in the art that all or some acts in the method disclosed above and function modules/units in the system and the apparatus may be implemented as software, firmware, hardware, and proper combinations thereof. In hardware implementations, the division between functional modules/units mentioned in the above description does not necessarily correspond to the division of physical components. For example, a physical component may have a plurality of functions, or a function or a step may be performed by several physical components in cooperation. Some components/devices or all components/devices may be implemented by a processor such as software executed by a digital signal processor or a microprocessor, or implemented as hardware, or implemented as integrated circuits such as application specific integrated circuits and the like. Such software may be distributed in a computer-readable medium, and the computer-readable medium may include a computer storage medium (or a non-transitory medium) and a communication medium (or a temporary medium). As known to those of ordinary skill in the art, term computer storage medium includes volatile/nonvolatile and removable/irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage or another magnetic storage device, or any other medium that may be used for storing desired information and may be accessed by a computer. In addition, it is known to those of ordinary skill in the art that the communication medium usually includes a computer-readable instruction, a data structure, a program module or other data in a modulated data signal, for example, a carrier or another transmission mechanism, and may include any information transmission medium.

Although the present disclosure discloses the above implementations, the content is only the implementations adopted for convenience of understanding the present disclosure, and is not intended to limit the present disclosure. Any person skilled in the art to which the present disclosure pertains may make any modifications and variations in the form and details of implementations without departing from the spirit and the scope of the present disclosure, but the protection scope of the present disclosure shall still be subject to the scope defined in the appended claims.

What is claimed is:

1. A display driving chip, comprising:
a gaze tracker, an image receiver, an image parser and an image driver, wherein:
the gaze tracker is configured to perform real-time locating for a pupil center of human eyes and real-time calculation for gaze point coordinates, and output the gaze point coordinates of human eyes to the image parser;
the image receiver is configured to receive image data to be played through a first image interface and input the image data to be played to the image parser;
the image parser is configured to compress or decompress the image data to be played according to the gaze point coordinates of human eyes, and output compressed image data or decompressed image data to the image driver; and
the image driver is configured to receive the image data output by the image parser, control a connected display panel and drive the display panel to display in real-time according to a compression pattern of the image data and the coordinates of the gaze point, wherein the image parser is configured to
detect whether the compressed image data needs to be decompressed when the image data to be played is compressed image data, and if so, decompress the compressed image data according to the gaze point coordinates of human eyes and output the decompressed image data to the image driver; if not, output compressed image data to the image driver; and when the image data to be played is an original image data, store the original image data into a first cache region, read the data of the first cache region, compress the read data according to the gaze point coordinates of human eyes, and output to the image driver.

2. The display driving chip of claim 1, wherein the gaze tracker comprises a pattern parser, a human eye detector, a pupil locater and a gaze point calculator, wherein:

the pattern parser is configured to determine a working pattern of an external pupil image acquisition component, and when the working pattern is a human face pattern, a human face image acquired by the pupil image acquisition component is input to the human eye detector; when the working pattern is a human eye pattern, a human eye image acquired by the pupil image acquisition component is input to the pupil locater;

the human eye detector is configured to perform eye detection on the human face image acquired by the pupil image acquisition component and output a detected human eye image to the pupil locater;

the pupil locater is configured to calculate position coordinates of pupils of human eyes in the human eye image; and the gaze point calculator is configured to calculate the gaze point coordinates of human eyes according to the position coordinates of the pupils of human eyes in the human eye image, and output the gaze point coordinates of human eyes to the image parser.

3. The display driving chip of claim 2, wherein the pupil locater comprises an image preprocessor, a pupil edge coordinate processor and a pupil center coordinate processor, wherein:

the image preprocessor is configured to remove noise information in the human eye image and determine a pupil target region;

the pupil edge coordinate processor is configured to determine pupil edge coordinates according to the pupil target region; and the pupil center coordinate processor is configured to determine pupil center coordinates according to the pupil edge coordinates.

4. The display driving chip of claim 1, wherein the gaze tracker outputs the gaze point coordinates of human eyes to the image parser through an Inter-Integrated Circuit (IIC) bus, a Serial Peripheral interface (SPI) bus or a universal asynchronous receiver/transmitter (UART) bus.

5. The display driving chip of claim 1, wherein the first image interface comprises a high definition multimedia interface (HDMI), a display Port (DP), a mobile industry processor interface (MIPI) or a low voltage differential signal (LVDS).

6. The display driving chip of claim 1, wherein that the image driver is configured to control the connected display panel and drive the display panel to display in real-time comprises:

the image driver is configured to
divide a display region corresponding to the display panel into a high-definition region and a low-definition region according to the gaze point coordinates of the human eyes; and drive the high-definition region and the low-definition region by different driving timings.

7. The display driving chip of claim 6, wherein the image driver is configured to drive the high-definition region and the low-definition region by different driving timings, which comprises:

the high-definition region is driven in the following ways: gate lines are driven one by one and data lines are driven one by one; and the low-definition region is driven in one or more of the following ways: a plurality of rows of gate lines are combined into one row to be driven, and a plurality of columns of data lines are combined into one column to be driven.

8. The display driving chip of claim 6, wherein the image driver is configured to drive the high-definition region and the low-definition region by different driving timings, which comprises:

when the image data received by the image driver is data obtained by the image parser compressing original image data, first image display of the low-definition region is driven, and then image display of the high-definition region is driven for several times; and when the image data received by the image driver is data obtained by an external image player compressing the original image data, first the image display of the high-definition region is driven, and then the image display of the low-definition region is driven.

9. A display apparatus, comprising: a pupil image acquisition component, an image player, a display panel and a display driving chip, wherein:

the pupil image acquisition component is configured to acquire user images and output the acquired user images to a gaze tracker;

the image player is configured to generate image data to be played and output the image data to be played to an image receiver; and the display panel is configured to display image data;

wherein the display driving chip comprises the gaze tracker, the image receiver, an image parser and an image driver, wherein:

the gaze tracker is configured to perform real-time locating for a pupil center of human eyes and real-time calculation for gaze point coordinates, and output the gaze point coordinates of human eyes to the image parser;

the image receiver is configured to receive the image data to be played through a first image interface and input the image data to be played to the image parser;

the image parser is configured to compress or decompress the image data to be played according to the gaze point coordinates of human eyes, and output compressed image data or decompressed image data to the image driver; and the image driver is configured to receive the image data output by the image parser, and control a connected display panel and drive the display panel to display in real-time according to a compression pattern of the image data and the gaze point coordinates, wherein the image parser is configured to
detect whether the compressed image data needs to be decompressed when the image data to be played is compressed image data, and if so, decompress the compressed image data according to the gaze point coordinates of human eyes and output a decompressed image data to the image driver; if not, output compressed image data to the image driver; and when the image data to be played is an original image data, store the original image data into a first cache region, read data of the first cache region, compress the read data according to the gaze point coordinates of human eyes, and output to the image driver.

10. The display apparatus of claim 9, wherein the gaze tracker is further configured to output the gaze point coordinates of human eyes to the image player;

the image player is further configured to receive the gaze point coordinates of the human eyes and compress the image data to be played according to the gaze point coordinates of the human eyes.

11. The display apparatus of claim 9, wherein the gaze tracker comprises a pattern parser, a human eye detector, a pupil locater and a gaze point calculator, wherein:

the pattern parser is configured to determine a working pattern of an external pupil image acquisition component, and when the working pattern is a human face pattern, a human face image acquired by the pupil image acquisition component is input to the human eye detector; when the working pattern is a human eye pattern, a human eye image acquired by the pupil image acquisition component is input to the pupil locater;

the human eye detector is configured to perform eye detection on the human face image acquired by the pupil image acquisition component and output a detected human eye image to the pupil locater;

the pupil locater is configured to calculate position coordinates of pupils of human eyes in the human eye image; and the gaze point calculator is configured to calculate the gaze point coordinates of human eyes according to the position coordinates of the pupils of human eyes in the human eye image, and output the gaze point coordinates of human eyes to the image parser.

12. The display apparatus of claim 11, wherein the pupil locater comprises an image preprocessor, a pupil edge coordinate processor and a pupil center coordinate processor, wherein:

the image preprocessor is configured to remove noise information in the human eye image and determine a pupil target region;

the pupil edge coordinate processor is configured to determine pupil edge coordinates according to the pupil target region; and the pupil center coordinate processor is configured to determine pupil center coordinates according to the pupil edge coordinates.

13. The display apparatus of claim 9, wherein the gaze tracker is configured to output the gaze point coordinates of human eyes to the image parser through an Inter-Integrated Circuit (IIC) bus, a Serial Peripheral interface (SPI) bus or a universal asynchronous receiver/transmitter (UART) bus.

14. The display apparatus of claim 9, wherein the first image interface comprises a high definition multimedia interface (HDMI), a display Port (DP), a mobile industry processor interface (MIPI) or a low voltage differential signal (LVDS).

15. The display apparatus of claim 9, wherein the image driver is configured to control the connected display panel and drive the display panel to display in real-time, which comprises:

the image driver is configured to divide a display region corresponding to the display panel into a high-definition region and a low-definition region according to the gaze point coordinates of the human eyes; and drive the high-definition region and the low-definition region by different driving timings.

16. The display apparatus of claim 15, wherein the image driver is configured to drive the high-definition region and the low-definition region by different driving timings, which comprises:

the high-definition region is driven in the following ways: gate lines are driven one by one and data lines are driven one by one; and the low-definition region is driven in one or more of the following ways: a plurality of rows of gate lines are combined into one row to be driven, and a plurality of columns of data lines are combined into one column to be driven.

17. The display apparatus of claim 15, wherein the image driver is configured to drive the high-definition region and the low-definition region by different driving timings, which comprises:

when the image data received by the image driver is data obtained by the image parser compressing original image data, first image display of the low-definition region is driven, and then image display of the high-definition region is driven for several times; and when the image data received by the image driver is data obtained by an external image player compressing the original image data, first the image display of the high-definition region is driven, and then the image display of the low-definition region is driven.

18. A display driving method, applied to the display driving chip of claim 1, and the method comprising:

real-time locating, by the gaze tracker, the pupil center of human eyes, real-time calculating, by the gaze tracker, the gaze point coordinates and outputting, by the gaze tracker, the gaze point coordinates of human eyes to the image parser;

receiving, by the image receiver, image data to be played through the first image interface and inputting, by the image receiver, the image data to be played to the image parser;

compressing or decompressing, by the image parser, the image data to be played according to the gaze point coordinates of human eyes, and outputting, by the image parser, the compressed or decompressed image data to the image driver; and receiving, by the image driver, the image data output by the image parser, and controlling, by the image driver, the connected display panel and driving, by the image driver, the display panel to display in real time according to the compression pattern of the image data and the coordinates of the gaze point.

* * * * *